3,649,715
Patented Mar. 14, 1972

3,649,715
FUEL-RESISTANT RUBBER VULCANIZATES COMPRISING HALOBUTYL RUBBER AND EPIHALOHYDRIN COPOLYMER
John T. Oetzel, Lorain, Ohio, assignor to The B. F. Goodrich Company, New York, N.Y.
No Drawing. Filed Nov. 1, 1968, Ser. No. 772,829
Int. Cl. C08f 29/12
U.S. Cl. 260—888
2 Claims

ABSTRACT OF THE DISCLOSURE

Blends of (1) an amorphous rubbery linear interpolymer of an epichlorohydrin and at least one other epoxide monomer such as an alkylene oxide with (2) minor amounts (5 to 20%/wt.) of a halogenated butyl rubber and (3) cured with a dual-cure non-sulfur mercaptoimiadzoline or amine with polyvalent metal compounds curing system are novel, highly useful vulcanizates which fully meet all military specifications for fuel-resistant arctic (low temperature service) rubber compounds. Carbon black containing vulcanizates of such blends have the requisite low swell in both Type I and Type II fluids, good flexibility and low compression set at −40° C., and excellent resistance to oxygen, ozone and high temperatures.

RELATED APPLICATIONS

Copending application Ser. No. 772,873 of even date herewith in names of L. J. Vandenberg and J. W. Messerly discloses and claims a tire having an inner liner based on blends of a halogenated butyl rubber and a rubbery epihalohydrin homopolymer and cured with a dual-cure mercaptoimidazoline magnesium oxide curing system.

SUMMARY OF INVENTION

I have found that blends of (1) an amorphous epihalohydrin interpolymer of, as essential monomeric ingredients, (a) an epihalohydrin and (b) at least one other epoxide monomer of the formula:

(1) 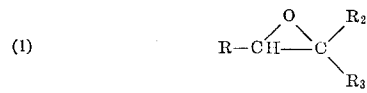

wherein $R_1$, $R_2$ and $R_3$ are hydrogen, alkyl, phenyl and alkoxyalkyl groups with at least one of said R radicals being hydrogen, with or without still other monomeric epoxy-type monomers (see below) and (2) minor proportions of a halogenated butyl rubber such as chlorobutyl rubber or bromobutyl rubber (after-chlorinated or after-brominated isobutylene/isoprene copolymer) and such blends are compounded and cured with (3) a mercaptoimidazoline/polyvalent metal compound or amine/polyvalent metal compound curing system form vulcanizates having an excellent combination of physical and chemical properties plus very good solvent resistance and very good low temperature properties. Such a combination of properties make such vulcanizates peculiarly well-adapted to use as solvent- and oil-resistant (fuel-resistant) artic rubbers. Vulcanizates of this class, can be prepared which meet all specifications for such service now required or proposed by U.S. military and aerospace authorities. Prior oil-resistant rubbers such as neoprene and the acrylic (butadiene/acrylonitrile) synthetic rubbers do not satisfy all artic military requirements because of one or more poor low temperature resilience and insufficient or excessive fuel-resistance. Military design requires rubbers which both retain considerable resilience at −40° F. and have a low but measurable swell in Type I fluid (isooctane) and in Type II fluid (60% isooctane/20% toluene/15% benzene).

DETAILED DESCRIPTION

Epihalohydrin interpolymer

This ingredient must be amorphous and saturated in character and for this reason must be an interpolymer and not a homopolymer of an epihalohydrin. Homopolymers of epihalohydrin monomers have a tendency to be more or less crystalline and, for this reason, have poor resilience and/or flexibility at arctic temperatures. Only a small proportion of another epoxy-type monomer combined in the polymer structure is sufficient to destroy the uniformity of structure responsible for the tendency to crystallize. Other than the comonomeric discontinuities in the structure of this copolymer, its structure is otherwise quite linear in nature. In general, only from about 1%/wt. up to about 10%/wt. of at least one epoxy comonomer of structure (1) above need be employed.

The desired amorphous epihalohydrin interpolymers are obtained by copolymerizing an epihalohydrin such as epichlorohydrin, epibromohydrin, epifluorohydrin, or mixtures thereof (wherein the total combined epihalohydrin content is as stated above) with the small proportions indicated above of one or more epoxy comonomers of the above formula. Illustrative epoxy comonomers include alkylene oxides such as ethylene oxide; propylene oxide, butene-1 oxide, cis- and trans-butene-2 oxide, particularly the cis configuration; cis- and trans-pentene-2 oxide, cis- and trans-hexene-2 oxide, cis- and trans-hexene-3 oxide and others; phenyl alkylene oxides such as styrene oxide and the like; and saturated glycidyl ethers such as methyl glycidyl ether, ethyl glycidyl ether, methylethyl glycidyl ether; butyl glycidyl ether, phenyl glycidyl ether, and others; and the like.

Such monomers are polymerized in mass or preferably in solution by contact therein with a catalyst formed by reacting an organometal, most preferably an organoaluminum compound such as a trialkyl aluminum, with about 0.1 mole to about 1.0 to 1.5 moles of water per mole of organoaluminum compound and, optionally with from about 0.01 to about 2 moles of a chelating agent such as acetylacetone, trifluoroacetyl acetone, ethoxyacetic acid, tetrahydrofuran, and others. Organoaluminum ingredients which may be so employed include triethylaluminum, tripropylamluminum, triisobutylaluminum, trioctylaluminum, diethylaluminum hydride, diisobutylaluminum hydride, and others. The process and rubbers produced are more fully described in U.S. Pat. No. 3,158,581.

For use in the present invention such rubbery, linear interploymers should have at least a minimum number average molecular weight of 70,000 as determined by Gel Permeation Chromatography. Such interpolymers for best processing qualities should have a Mooney viscosity after 4 minutes at 212° F. using the 4-inch rotor of from about 50 to about 110 ml.

Halobutyl rubber

This ingredient may be any of the commercially-available grades produced by the addition of a molecular halogen, preferably a halogen of atomic number above 35, to a butyl rubber (isobutylene/isoprene copolymer containing from about 1 mol percent to about 3 mol percent combined isoprene units). Such materials include chloro-, bromo- and iodo-butyl rubbers wherein from about 25% up to about 100% of the normal unsaturated groupings have been satisfied by addition of the molecular halogen and the splitting out of an equimolar quantity of the corresponding hydrohalogen acid. A suitable commercially-available chlorobutyl rubber contains from about 1.1% to about 1.35%/wt. of combined chlorine (prepared from a high molecular weight original butyl rubber containing from about 1 to 2 mol percent of combined isoprene units) and has a Mooney viscosity after 8 minutes at 212° F. using the large (4-inch rotor) of from about 70 to about 80 ml. A satisfactory bromobutyl rubber made from a slightly more unsaturated butyl rubber (2 to 3 mol percent combined isoprene) contains from about 2.1 to about 3%/wt. of combined bromine, a density at 25° C. of about 0.96, and has a Mooney viscosity (4' at 212° F.) of from about 50 to about 70 ml.

Curative system

As indicated above, only the curative system disclosed herein will produce the arctic fuel-resistant vulcanizates of this invention. Such curing system is especially useful, synergistic, and is believed to function by mechanisms other than by the generation of sulfur-rubber cross-links. For convenience, such system is sometimes referred to herein as a "nonsulfur cure system."

Numerous literature references to the contrary, the saturated epihalohydrin interpolymer rubber appears not to be a sulfur-vulcanizable rubber. Likewise, the halobutyl rubber constituent of the vulcanizates of this invention is not fully a sulfur-vulcanizable rubber because of its very low residual unsaturation. Rather, the latter rubber appears to be curable by reaction of a polyvalent metal compound with allylic halogen atoms similar to those believed present in neoprene rubber. It is believed, although proof of this is most difficult, that the vulcanizates of this invention are vulcanized by a conjoint cure involving (1) mercaptoimidazoline/polyvalent metal or amine/polyvalent metal nonsulfur cure of the saturated epihalohydrin interpolymer, (2) a polyvalent metal compound or neoprene-type cure of the halobutyl rubber, and (3) perhaps a mercaptoimidazoline type cure of the halobutyl ingredient. There could be a very small amount of a sulfur cure through the very small amount of any residual unsaturation in the halobutyl rubber.

The very great stability of the vulcanizates of this invention to heat, oxygen, ozone, flexure, etc., is the best available evidence of a nonsulfur cure. Sulfur-rubber crosslinks in most other rubbery materials do not have this order to stability. Thus, the combination of (1) a particular curing system with (2) blends of two specific types of specialty rubbers is believed responsible for the superiority of the arctic rubber vulcanizates of this invention.

The curing system of this invention involves two essential ingredients, one being an organic constituent selected from the class of mercaptoimidazoline compounds (see below) and polyamines (see also below) and the other being a polyvalent metal compound.

The mercaptoimidazoline curative may be any compound of the formula

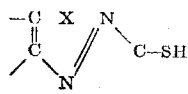

wherein the unsatisfied bonds are attached to the similar or different alkyl groups of 1 to 6 carbon atoms each and X is a single or double bond. Thus, there may be utilized 2 - mercaptoimidazoline, 4-methyl-2-mercaptoimidazoline, 5-ethyl-4-2-mercaptoimidazoline, 2 - mercaptopyrimidine (wherein X in the above formula is a double bond), 4,6-dimethyl-2-mercaptopyrimidine, 5 - butyl - 2 - mercaptopyrimidine, 4-ethyl-5-propyl-2-mercaptopyrimidine, and many others. The preferred curative is 2-mercaptoimidazoline which is commercially available and is an active curative yielding an excellent balance of physical properties, on the one hand, and solvent resistance and stability on the other.

The polyamine curative may be any amine containing two or more amino groups per molecule. The amino groups may be primary, secondary or tertiary amino groups. Polyamines found useful include hydrazine; alipatic amines such as ethylenediamine, propylenediamine, tetramethylenediamine, hexamethylenediamine, and other alkylenediamines of up to 20 carbon atoms or more, diethylenetriamine, and others; cycloaliphatic amines such as melamine, piperazine, pyrazine (paradiazine), and others; aromatic amines such as p-phenylenediamine, naphthalenediamine, biphenyldiamine, and others; and polymeric amines such as poly(2-methyl-5-vinylpyridine), and others. Where an alkaline polyvalent metal oxide is otherwise included in the rubber composition an amine salt may be employed in addition to or instead of the free amine as, for example, the hydrogen halide salts of the amine or the internal type salt of the amine such as, for example, hexamethylenediamine carbamate, which salt decomposes to the free amine at or below the curing temperature.

The other essential ingredient is a compound of a polyvalent metal of Groups II–A, II–B, III–A, IV–B and V–A of the Periodic Table. Such metals may be magnesium, lead, cadmium, calcium, strontium, barium, aluminum, indium, titanium, manganese, zirconium, nickel, molybdenum, tin, mercury, beryllium, magnesium, zinc, and others. Such metal must be employed as a compound which may be an oxide (preferred), salt (particularly a fatty acid salt such as calcium stearate), a chelate, a carbonate, silicate, phosphate, phthalate, salicylate, and many others. Such compounds include, more specifically, red lead ($Pb_2O_4$), lead oxide (litharge), zinc oxide, cadmium oxide, magnesium oxide, stannous and stannic oxides, calcium oxide, calcium carbonate, magnesium benzoate, calcium benzoate, strontium salicylate, lead oleate, dibasic lead stearate, dibasic lead phosphate, aluminum silicate, lead oleate, and many others. Preferred are red lead for a fast tight cure and magnesium oxide for longer scorch times and more elongated or flatter curing characteristics.

The proportions of the two curing ingredients may vary from about 0.25 to 10%/wt. of either of the mercaptoimidazoline or amine types of ingredient and from about 1 to 20%/wt. of the polyvalent metal compound, all based on the total weight of rubbery ingredients. More preferred are from about 0.75 to about 4.0%/wt. of the imidazoline type ingredients, from about 1 to about 5%/wt. of the amine and from about 1 to 10%/wt. of the polyvalent metal compound.

The vulcanizates will preferably include a reinforcing pigment such as any of the low, medium and high structure carbon blacks, fine calcium silicate, silica, and the like. The proportion of filler may range from as low as about 5 to about 200 parts/wt. for every 100 parts/wt. of total rubbery ingredients (hereinafter "phr.") in the composition. A more preferred range for non-black fillers is from about 20 to about 150 phr. and for carbon blacks from about 25 to about 75 phr.

In addition to the above essential and named highly preferred ingredients, the arctic rubber vulcanizates should otherwise be compounded in accordance with known rubber compounding principles by the inclusion of the required proportions of pigments, lubricants, plasticizers, softeners, stabilizers, antioxidants, anti-ozonants, tackifiers, diluents, and others to suitably prepare the stock for the particular processing, shaping, forming, and/or article building operations envisaged.

Mixing and cure conditions

The compositions may be prepared and cured by any conventional method. For example, the compositions may be prepared by mill-mixing or by Banbury mixing. A good procedure on either style mixer is to first add the rubbers only and carry out a short preliminary blending for a minute or two, then add most of the remaining ingredients, except the curatives, and continue the mixing for an additional 3 to 5 minutes or until dispersion of the ingredients in the rubber blend is achieved. The last addition is the two curatives and this preferably should be effected on a cool rubber mill having water-cooled rolls to avoid scorching (or pre-curing) the composition. Mixing is best carried out under cool conditions to avoid sticky stages in the mixing and undue breakdown of the rubbers. Once mixing is complete the stock may be sheeted off the rubber mill ready for the final molding, extruding, calendering, etc., operations.

The resulting uncured compositions require heating, preferably under confinement, at elevated temperatures between about 250° F. to about 475° F. with from about 325 to 360° F. being more preferred. Depending both on the choice and proportions of the two curatives and on the temperature in the above ranges, vulcanization is usually complete in a matter of a few minutes ranging from about 10 to about 60 minutes. Vulcanization occurs with the production of strong, elastic compositions of good dimensional and chemical stability and good resistance to low temperatures in the presence of hydrocarbon fuels in a wide range of environments.

The invention will now be described more fully with reference to a number of specific examples, which are intended as being illustrative only rather than as limiting the invention.

EXAMPLE

In this example, there is utilized an amorphous, essentially linear and very rubbery copolymer of epichlorohydrin and ethylene oxide containing from about 20% to 25%/wt. of combined ethylene oxide; having a density at 25° C. of 1.27; and a Mooney viscosity after 4 minutes at 212° F. using the large (4-inch) rotor of about 100 ml. The halobutyl rubber constituent employed in these experiments is "Enjay Chlorobutyl HT 10–68" (made by Enjay Chemical Co.) having a combined chlorine content of 1.1 to 1.3%/wt.; made from a butyl rubber of 1 to 2 mol percent of isoprene units; and having a Mooney viscosity after 8 minutes at 212° F. (large rotor) or 70 to 89 ml. The experiments are carried out preparing three "masterbatch" (see below) compositions to which the variable ingredients are added. These compositions are prepared by Banbury mixing by the procedure described above. The masterbatches employed are:

| Material | MB-1 | MB-L | MB-3 |
|---|---|---|---|
| Epichlorohydrin/EO copolymer | 100 | 90 | 80 |
| Chlorobutyl rubber | 0 | 10 | 20 |
| Zinc stearate | 1 | 1 | 1 |
| Red lead | 5 | 5 | 5 |
| NBC [1] | 1 | 1 | 1 |
| HAF carbon black | 25 | 25 | 25 |
| MT carbon black | 15 | 15 | 15 |
| | 152.5 | 152.5 | 152.5 |

[1] "NBC"=nickel dibutyl dithiocarbomate, made by Du Pont.

To the above mixtures there are added varying amounts of carbon black, plasticizer, tackifiers, curatives, etc., to produce final compositions which are then tested as such or vulcanized in a standard ASTM test sheet mold for twenty minutes at 347° F. and the resulting sheets tested by standard (ASTM) procedures.

The table below lists the added ingredients, the Mooney Scorch data on the unvulcanized stock, and the physical properties as determined on the vulcanized sheets.

TABLE

| Property Sample No. | 1 | 2 | 3 |
|---|---|---|---|
| Material, parts/wt.: | | | |
| MB-1 | | 152.5 | |
| MB-2 | 152.5 | | |
| MB-3 | | | 152.5 |
| HAF carbon black | 25 | 25 | 25 |
| Dioctyl phthalate | 15 | 15 | 15 |
| TP-90B [1] | 5 | 5 | 5 |
| NA-22 [2] | 1.5 | 1.5 | 1.5 |
| Total phr | 199 | 199 | 199 |
| Properties, originals physical-cured 20'/347° F.: | | | |
| M100, p.s.i | 450 | 430 | 430 |
| M200, p.s.i | 1,200 | 1,150 | 1,150 |
| Tensile, p.s.i | 1,860 | 2,090 | 1,840 |
| Elongation, percent | 320 | 380 | 350 |
| Hardness A | 67 | 65 | 64 |
| Specific grav. at 25° C., gms./ml | 1.37 | 1.39 | 1.34 |
| Graves tear, WG, die C, lbs./in | 130 | 125 | 100 |
| Compression set, buttons cured 25' at 347, method B: | | | |
| 46 hrs./100° C., percent | 30 | 37 | 31 |
| 70 hrs./−40° C./40% def 10 sec. recovery, percent | 53 | 51 | 63 |
| 30 min. recovery, percent | 23 | 24 | 25 |
| Ozone aged 120° F., 100 pphm., bent loop: | | | |
| Time to [3] | NC | NC | NC |
| G.C. | 168 | 168 | 168 |
| Gehman low temperature torsion test: | | | |
| $T_5$, ° C | −42 | −44.5 | −44 |
| F.P., ° C | −51 | −51 | −51 |
| Air aging, test tube 70 hrs. at 150° C.: | | | |
| ULT. tensile | 1,060 | 1,150 | 1,040 |
| ΔT | −43 | −45 | −43 |
| Percent elongation | 200 | 230 | 200 |
| ΔE | −37 | −39 | −43 |
| Shore A | 80 | 84 | 78 |
| ΔH | +13 | +19 | +14 |
| 180° bend | Pass | Pass | Pass |
| Percent wt. change | −2.8 | −4.6 | −3.2 |
| Fuel resistance: | | | |
| ASTM #1, aged 70 hrs. at 150° C.— | | | |
| (Percent T) percent tensile change | +7 | −5 | +3 |
| (Percent E) percent elongation change | −44 | −52 | −51 |
| (Percent V) percent volume change | −10 | −15 | −4 |
| 180° bend | P | P | P |
| ASTM #3, aged 70 hrs. at 150° C.— | | | |
| Percent T | −14 | −7 | −26 |
| Percent E | −34 | −44 | −51 |
| Percent V | +10 | −3 | +25 |
| 180° bend | P | P | P |
| Type I, aged 46 hrs. at 23° C.— | | | |
| Points hardness change | +1 | +3 | +1 |
| Percent V | −0.8 | −2.9 | +5.4 |
| 180° bend | P | P | P |
| Type II, aged 46 hrs. at 23° C.— | | | |
| Points hardness change | −8 | −6 | −10 |
| Percent V | +22 | +12 | +33 |
| 180° bend | P | P | P |
| $H_2O$ absorption, aged 70 hrs. at 100° C.— | | | |
| Points hardness change | −9 | −10 | −6 |
| Percent V | +20 | +19 | +19 |
| 180° bend | P | P | P |

[1] A low temperature plasticizer made by Thiokol Corp. said to be a high molecular weight polyether.
[2] 2-mercaptoimidazoline, made by Du Pont.
[3] Time to general cracking.
NOTE.—P=Pass.

The data above show excellent physical properties over a wide range of compounding and under severe conditions. In particular, all of the vulcanizates are quite tear resistant, have very, very good low temperature flexibility and very low freeze points (the latter −53° to −61° F.), exceptional resistance to heat and ozone, and excellent resistance to solvents and water. The above properties clearly indicate that as the proportion of chlorobutyl is increased from 10 to 20 phr. some increase in curatives above the 0.75 phr., level is desirable to improve tear resistance, reduce permanent set, and improve modulus and tensile strength.

I claim:

1. A fuel-resistant vulcanized rubber composition adapted to arctic service comprising, as the essential rubbery constituents, (1) a rubbery, amorphous interpolymer of at least 90%/wt. of an epihalohydrin with at least 1%/wt. total of one or more saturated epoxy monomers of the structure

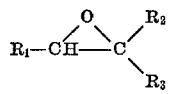

wherein $R_1$, $R_2$, and $R_3$ are hydrogen, alkyl, alkoxyalkyl or phenyl radicals with at least one of $R_1$, $R_2$ and $R_3$ being hydrogen and (2) a halogenated rubbery copolymer of isobutylene and from about 1 to about 3 mol percent of combined isoprene in which from about 25% to about 100%/wt. of the said combined isoprene units have been saturated by reaction with halogen of atomic number greater than 35 together with (3) as a dual-cure system, (a) from about 0.25 to about 10 parts/wt. per 100 parts/wt. of ingredients (1) and (2) of an organic curative selected from the class consisting of mercaptoimidazoline compounds of the structure

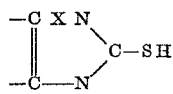

wherein the unsatisfied bonds are attached to similar or different alkyl groups of 1 to 6 carbon atoms each and X is a single or double bond and polyamines containing at least two amino groups per molecule and (b) from about 1 to about 20 parts/wt. per 100 parts/wt. of (1) and (2) of a polyvalent metal compound selected from the class consisting of oxides and salts of metals of Groups II-A, II-B, III-A, IV-B and V-A of the Periodic Table, said rubber ingredients (1) and (2) being present in the proportion of from about 80 to about 95 parts/wt. of (1) and from about 5 to about 20 parts/wt. of (2), said composition having been heated at a temperature of from about 250° to about 475° F. for a time sufficient to effect vulcanization without the formulation of sulfur crosslinks.

2. A composition as claimed in claim 1 and further characterized in that rubbery ingredient (1) is a two-component copolymer of epichlorohydrin and ethylene oxide, said rubbery ingredient (2) is a rubbery chlorinated rubbery copolymer of the type defined containing from about 1% to about 2%/wt. of combined chlorine, and said curative system is 2-mercaptoimidazoline and red lead.

References Cited
UNITED STATES PATENTS

| | | | |
|---|---|---|---|
| 3,104,235 | 9/1963 | Kuntz et al. | 260—85.3 |
| 3,341,491 | 9/1967 | Robinson et al. | 260—2 |
| 3,351,517 | 11/1967 | Willis | 260—3 |

MURRAY TILLMAN, Primary Examiner

C. J. SECCURO, Assistant Examiner

U.S. Cl. X.R.

260—23.7 B, 23.7 H, 41.5 R, 41.5 A

PO-1050
(5/69)

UNITED STATES PATENT OFFICE
CERTIFICATE OF CORRECTION

Patent No. 3,649,715  Dated March 14, 1972

Inventor(s) JOHN T. OETZEL

It is certified that error appears in the above-identified patent and that said Letters Patent are hereby corrected as shown below:

Col. 1, line 30 "772,873" should read --772,837--.

Col. 3, line 56 "to" should read --of--.

Signed and sealed this 18th day of July 1972.

(SEAL)
Attest:

EDWARD M. FLETCHER, JR.  ROBERT GOTTSCHALK
Attesting Officer  Commissioner of Patents